United States Patent
Aoyama et al.

(10) Patent No.: US 6,565,469 B1
(45) Date of Patent: May 20, 2003

(54) BELT FOR CONTINUOUSLY VARIABLE TRANSMISSION

(75) Inventors: Hideaki Aoyama, Wako (JP); Takamichi Shimada, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/597,755

(22) Filed: Jun. 19, 2000

(30) Foreign Application Priority Data

Jun. 18, 1999 (JP) .......................... 11-173246

(51) Int. Cl.$^7$ ............................................. F16G 5/16
(52) U.S. Cl. ........................................ 474/242; 474/240
(58) Field of Search ............................. 474/242, 245, 474/201, 246, 248, 240, 237, 202

(56) References Cited

U.S. PATENT DOCUMENTS

| | | | | |
|---|---|---|---|---|
| 4,813,920 A | * | 3/1989 | Inukai et al. | 474/242 |
| 4,826,473 A | | 5/1989 | Miyawaki | |
| 4,854,926 A | * | 8/1989 | Hattori | 474/242 |
| 4,900,296 A | * | 2/1990 | Schmidt | 474/242 |
| 5,019,020 A | * | 5/1991 | van Lith | 474/240 |
| 6,074,317 A | * | 6/2000 | Kobayashi | 474/242 |

FOREIGN PATENT DOCUMENTS

| | | | |
|---|---|---|---|
| EP | 0 278 545 A | | 8/1988 |
| EP | 1069-342 | * | 10/1999 |
| JP | 5-5310 | | 2/1993 |
| JP | 5-37067 | | 9/1993 |
| JP | 5-64254 | | 9/1993 |
| JP | 11-132294 | * | 5/1999 |
| JP | 11-351335 | * | 12/1999 |
| JP | 2000-2301 | * | 1/2000 |

* cited by examiner

*Primary Examiner*—Marcus Charles
(74) *Attorney, Agent, or Firm*—Arent Fox Kintner Plotkin & Kahn, PLLC

(57) ABSTRACT

A belt for a continuously variable transmission including a plurality of metal ring assemblies and a plurality of metal elements is provided, wherein a main surface of each of the plurality of metal elements is formed at its three portions with contact faces for transmitting a pushing force in the fore-and-aft direction, and the radial position of the centroid of the contact faces is set between a center line in a thickness direction of the metal ring assembly fitted into the ring slot of the metal element and a line along a radial outer edge of the ring slot. With this structure, a compressed-side chord of the metal belt can assume a straight shape or a slightly outwardly warped shape, and it is possible to elongate the life of the metal ring assemblies to reduce noise and vibration, and to enhance the power transmitting efficiency.

4 Claims, 8 Drawing Sheets

BELT FOR CONTINUOUSLY VARIABLE TRANSMISSION

BACKGROUND OF THE INVENTION

1. Field of the Invention

The present invention relates to a belt for a continuously variable transmission comprising, metal ring assemblies each having a plurality of laminated endless metal rings, and a plurality of metal elements each having ring slots to which the metal ring assemblies are fitted, the belt being wound around a drive pulley and a driven pulley for transmitting a driving force between both of the pulleys.

2. Description of the Related Art

Figure 8A:
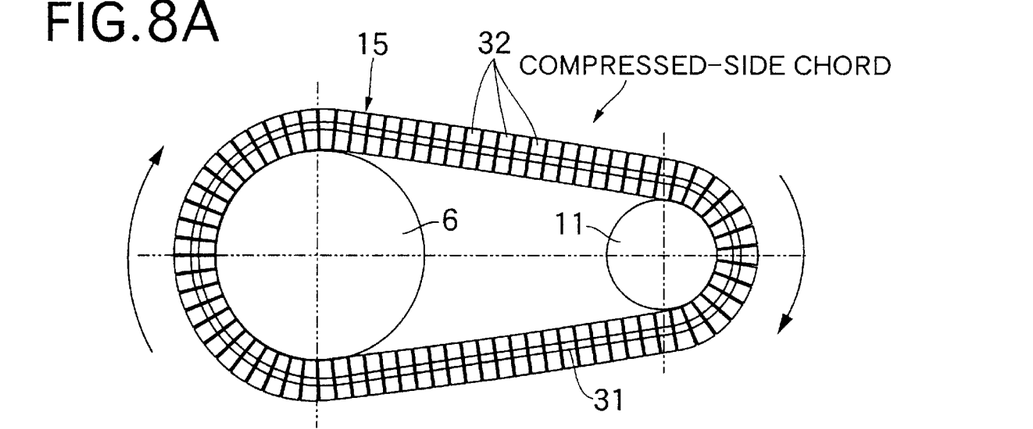
FIGS. 8A to 8C are views for explaining warp shapes of the compressed-side chord of the metal belt.
Figure 8B:
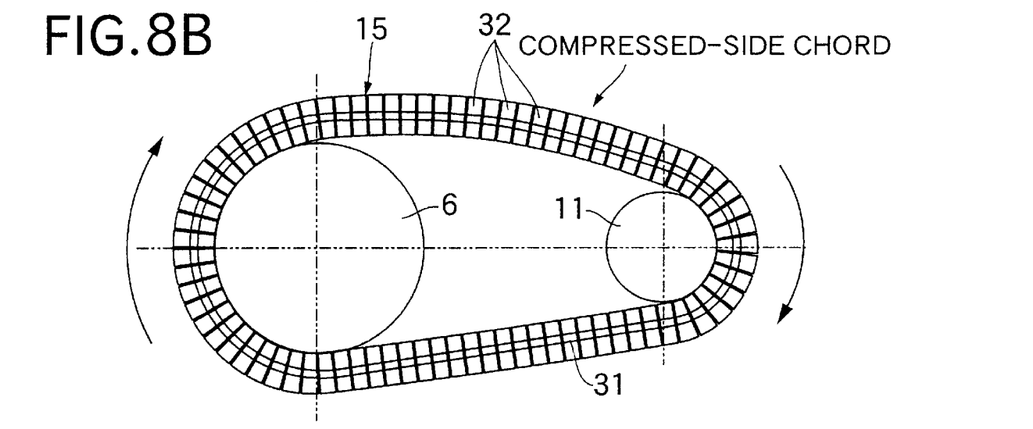
Figure 8C:
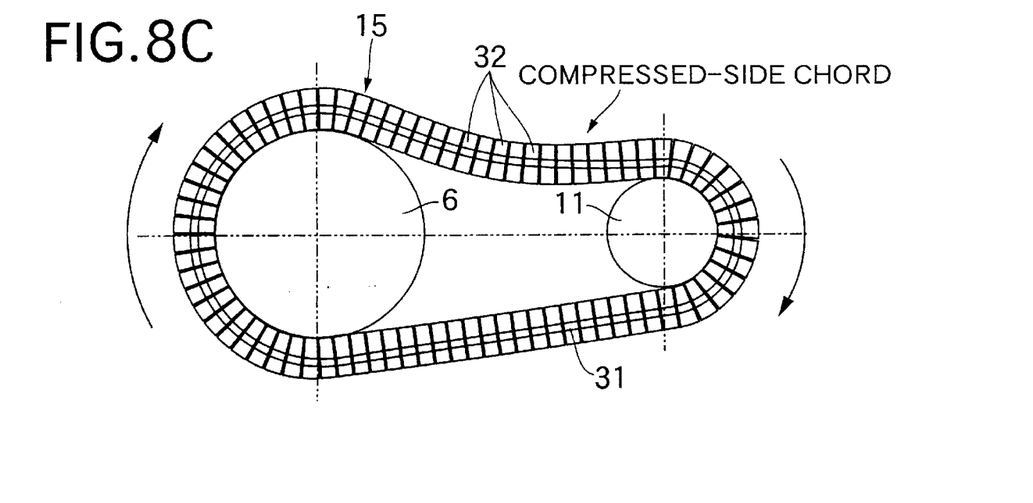

FIGS. 8A to 8C show a metal belt type continuous variable transmission, and show the shape of a compressed-side chord (chord between an outgoing side of a drive pulley 6 and an incoming side of a driven pulley 11) of a metal belt 15 wound around the drive pulley 6 and the driven pulley 11. FIG. 8A shows an ideal state in which the compressed-side chord is straight. In this state, the pushing force between metal elements 32 can be transmitted most efficiently, a load acting on inner circumferential surfaces of metal ring assemblies 31, 31 from saddle surfaces of ring slots of the metal elements 32 becomes small, and fatigue of the metal ring assemblies 31, 31 is reduced and the life thereof is increased. FIG. 8B shows a state in which the compressed-side chord is slightly warped outwardly (swelled radially outwardly). In this state, since the inner circumferential surfaces of the metal ring assemblies 31, 31 come into contact with the saddle surfaces of the ring slots under appropriate surface pressure, it is possible to stabilize the attitude of the metal element 32 in a rolling direction without lowering the durability of the metal ring assemblies 31, 31.

In contrast to the above states, FIG. 8C shows a state in which the compressed-side chord is slightly warped inwardly (swelled radially inwardly). In this state, since the inner circumferential surfaces of the metal ring assemblies 31, 31 float from the saddle surfaces (radially inward edges) of the ring slots of the metal elements 32 and come into contact with radially outward edges of the ring slots, the life of the metal ring assemblies 31, 31 is shortened, the metal elements 32 are rolled with respect to the metal ring assemblies 31, 31 and the attitude of the metal elements 32 becomes unstable, and there is a problem wherein vibration or noise is generated.

Further, it is known to increase thicknesses of portions of main surfaces of the metal elements to form contact portions, and to bring adjacent metal elements into abutment against each other through the contact portions to transmit the pushing force as disclosed in Japanese Utility Model Registration Publications Nos. 5-37067 and 5-5310 as well as Japanese Patent Publication No. 5-64254.

According to Japanese Utility Model Registration Publication No. 5-37067, three portions of a body of a metal element and two portions of an ear are made thicker than other portions to form a contact portion, and a neck connecting the body and the ear to each other is provided with elasticity, so that even if a drive pulley and a driven pulley are deviated or misaligned in the axial direction, the power can be transmitted in a direction perpendicular to the axis of the pulley, thereby enhancing the power transmitting efficiency.

According to Japanese Utility Model Registration Publication No. 5-5310, the compressive strain of a contact portion of a body located on a radially outer side from a locking edge of a metal element and the compressive strain of a contact portion of an ear are set substantially equal to each other so as to prevent fluctuation of attitude of the metal element when the latter transmits the pushing force, thereby enhancing the power transmitting efficiency.

Further, according to Japanese Patent Publication No. 5-64254, two portions of a body of a metal element, one portion of a neck and two portions of an ear are made thicker than other portions to form a bilaterally symmetrical contact portion. The displacement characteristics between the metal elements due to a pushing force and the compliance value of a compressed-side chord of a metal belt are made approximately consistent with each other, thereby providing the metal element itself with stable straight properties and displacement characteristics appropriate to misalignment levels.

However, in Japanese Utility Model Registration Publication No. 5-37067 and Japanese Patent Publication No. 5-64254, the shape of the metal element is devised for absorbing the misalignment, and the radial warp of the metal belt of the compressed-side chord is not taken into account at all. Further, Japanese Utility Model Registration Publication No. 5-5310 is aimed at keeping the compressed-side chord of the metal belt straight and therefore, there is a problem that the excellent state (see FIG. 8B) of the metal belt in which the compressed-side chord is slightly warp outwardly can not be allowed and flexibility in design of the contact portion of the metal element is limited.

SUMMARY OF THE INVENTION

The present invention has been accomplished in view of the above-described circumstances, and it is an object of the present invention to obtain an appropriate warp shape of a compressed-side chord of a metal belt by appropriately locating the contact portion at which metal elements come into contact with each other.

To achieve the above object, according to a first feature of the present invention, there is provided a belt for a continuously variable transmission comprising, metal ring assemblies each including a plurality of laminated endless metal rings, and a plurality of metal elements each having ring slots to which the metal ring assemblies are fitted. The belt is wound around a drive pulley and a driven pulley for transmitting a driving force between both the pulleys. A main surface of each of the metal elements is formed at portions thereof with contact faces for transmitting a compression load in the fore-and-aft direction, with the radial position of the centroid of the contact faces being set between the center in a thickness direction of the metal ring assembly fitted into the ring slot and the radial outer edge of the ring slot.

With the above structure, since the radial position of the centroid of the contact faces formed on portions of the main surface of the metal element, is set between the center in the thickness direction of the metal ring assembly fitted into the ring slot and the radial outer edge of the ring slot, a compressed-side chord of the metal belt can assume a straight shape or a slightly outwardly warped shape, and it is possible to elongate the life of the metal ring assemblies, to reduce noise and vibration, and to enhance the power transmitting efficiency.

BRIEF DESCRIPTION OF THE DRAWINGS

FIGS. 1 to 5 show a first embodiment of the present invention.

FIGS. 6 and 7 show a second embodiment of the present invention.

DETAILED DESCRIPTION OF THE PREFERRED EMBODIMENTS

Figure 2:
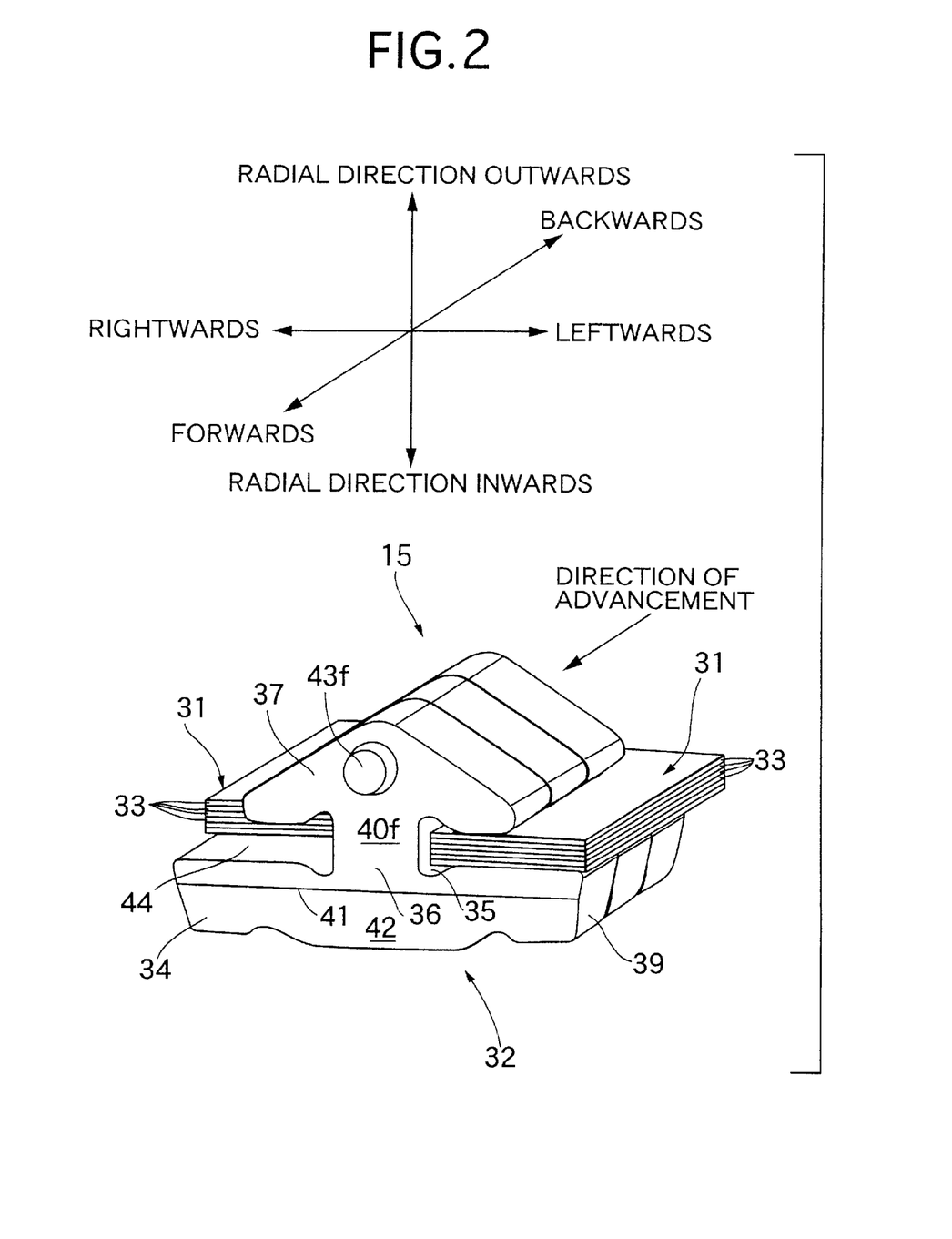
FIG. 2 is a perspective view of a portion of the metal belt of the present invention.

In describing the present invention, the fore-and-aft direction, the lateral direction and the radial direction of a metal element used in the embodiments are defined in FIG. 2. The radial direction is defined as the radial direction of a pulley against which the metal element abuts, and the radially inward location means a location closer to the axis of revolution of the pulley, and the radially outward location means a location further from the axis of revolution of the pulley. The lateral direction is defined as the direction along the axis of revolution of the pulley, and the fore-and-aft direction is defined as the direction along the direction of travel when the metal elements of a vehicle travel forwardly.

The present invention will now be described by way of embodiments with reference to the accompanying drawings.

Figure 1:
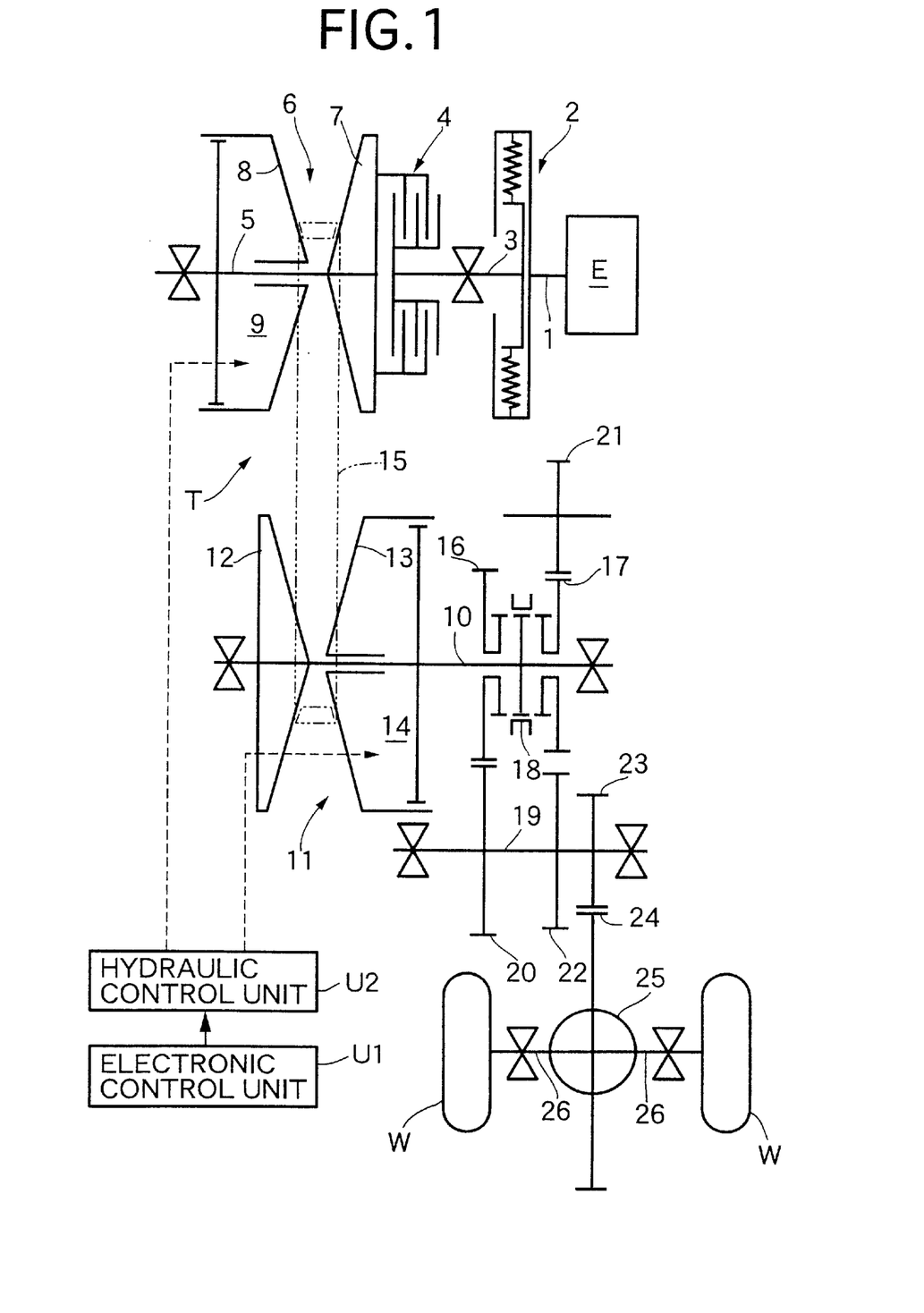
FIG. 1 is a schematic view of a power transmitting system of a vehicle in which a continuously variable transmission is mounted.

FIG. 1 schematically shows the structure of a metal belt type continuously variable transmission T mounted in an automobile, and an input shaft 3 connected to a crankshaft 1 of an engine E through a damper 2 is connected to a drive shaft 5 of the metal belt type continuously variable transmission T through a start-clutch 4. A drive pulley 6 provided on the drive shaft 5, includes a stationary pulley half 7 fixed to the drive shaft 5 and a movable pulley half 8 which can be connected to and separated from the stationary pulley half 7. The movable pulley half 8 is biased toward the stationary pulley half 7 by hydraulic pressure acting on an oil chamber 9.

A driven pulley 11 provided on a driven shaft 10 disposed in parallel to the drive shaft 5 includes a stationary pulley half 12 fixed to the driven shaft 10, and a movable pulley half 13 which can be connected to and separated from the stationary pulley half 12. The movable pulley half 13 is biased toward the stationary pulley half 12 by hydraulic pressure acting on an oil chamber 14. A metal belt 15 (see FIG. 2) is wound around both the drive pulley 6 and the driven pulley 11. The metal belt 15 comprises a plurality of metal elements 32 supported by a pair of left and right metal ring assemblies 31, 31. Each of the metal ring assemblies 31, 31 comprises twelve metal rings 33 which are laminated on one another.

A forward drive gear 16 and a backward drive gear 17 are relatively rotatably supported by the driven shaft 10. The forward drive gear 16 and the backward drive gear 17 can be selectively connected to the driven shaft 10 by a selector 18. A forward driven gear 20 which is meshed with the forward drive gear 16 and a backward driven gear 22 which is meshed with the backward drive gear 17 through a rearward idling gear 21, are fixed to an output shaft 19 which is disposed in parallel to the driven shaft 10.

The rotation of the output shaft 19 is input to a differential gear 25 through a final drive gear 23 and a final driven gear 24, and is transmitted therefrom to driven wheels W, W through left and right axles 26, 26.

The driving force of the engine E is transmitted to the driven shaft 10 through a crankshaft 1, the damper 2, the input shaft 3, the start-clutch 4, the drive shaft 5, the drive pulley 6, the metal belt 15 and the driven pulley 11. When a forward running range is selected, the driving force of the driven shaft 10 is transmitted to the output shaft 19 through the forward drive gear 16 and the forward driven gear 20, thereby allowing the vehicle to run forward. When a rearward running range is selected, the driving force of the driven shaft 10 is transmitted to the output shaft 19 through the backward drive gear 17, the rearward idling gear 21 and the backward driven gear 22, hereby allowing the vehicle to run rearward.

At this stage, hydraulic pressure acting on the oil chamber 9 of the drive pulley 6 of the metal belt type continuously variable transmission T and the oil chamber 14 of the driven pulley 11 are controlled by a hydraulic pressure control unit $U_2$ which is operated by a command from an electronic control unit $U_1$, thereby adjusting the change gear ratio in a stepless manner. That is, if the hydraulic pressure acting on the oil chamber 14 of the driven pulley 11 is increased relative to the hydraulic pressure acting on the oil chamber 9 of the drive pulley 6, the width of the groove of the driven pulley 11 is reduced and its effective radius is increased and correspondingly, the width of the groove of the drive pulley 6 is increased and its effective radius is reduced. Therefore, the change gear ratio of the metal belt type continuously variable transmission T is varied toward LOW in a stepless manner. Conversely, if the hydraulic pressure acting on the oil chamber 9 of the drive pulley 6 is increased relative to the hydraulic pressure acting on the oil chamber 14 of the driven pulley 11, the width of the groove of the drive pulley 6 is reduced and its effective radius is increased and correspondingly, the width of the groove of the driven pulley 11 is increased and its effective radius is reduced. Therefore, the change gear ratio of the metal belt type continuously variable transmission T is varied toward OD in a stepless manner.

Figure 3:
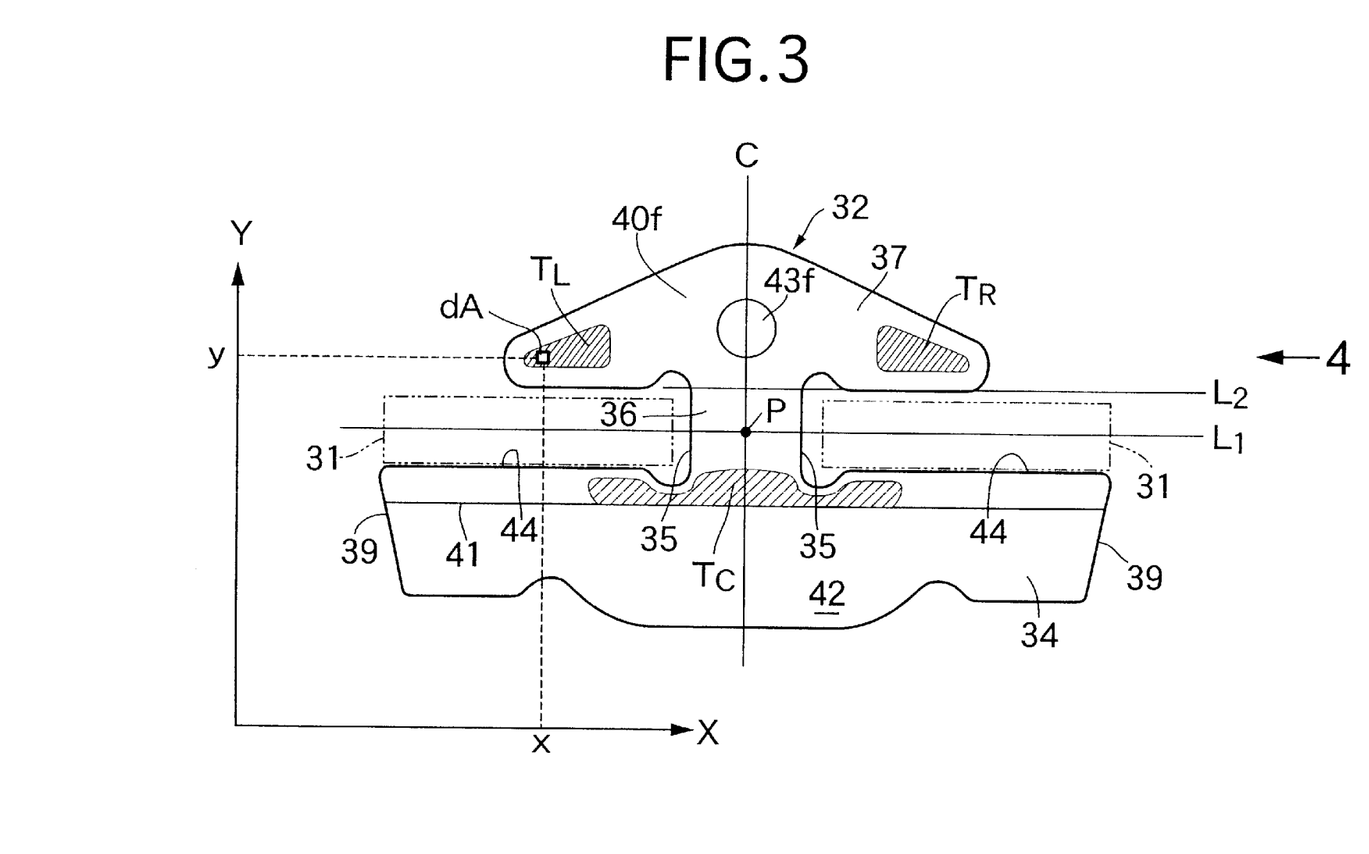
FIG. 3 is a front view of a metal element.
Figure 4:
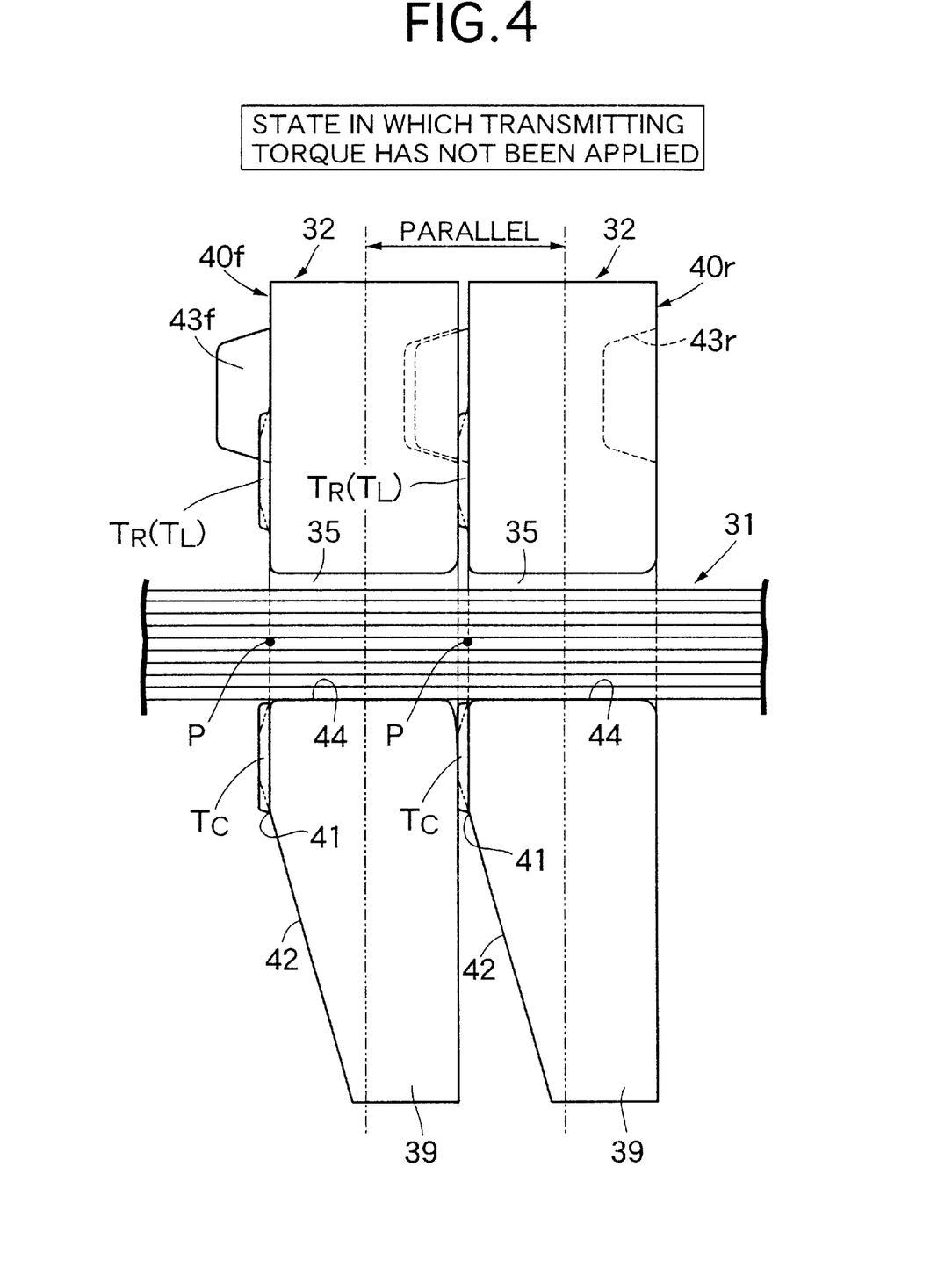
FIG. 4 is a view taken in the direction of an arrow 4 in FIG. 3 the view showing the metal elements with no transmitting torque applied.

As shown in FIGS. 2 to 4, each of the metal elements 32 which is formed of stamped metal plate includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34. The element body 34 is formed at its laterally opposite ends with a pair of pulley abutment surfaces 39, 39 capable of abutting against V-surfaces of the drive pulley 6 and the driven pulley 11. Each element 32 is formed at its front and rear portions in the direction of travel with a pair of front and rear main surfaces 40f, 40r which are intersecting at right angles with the direction of travel and parallel to each other. The front main surface 40f in the direction of travel is formed at its lower portion with an inclined surface 42 through a locking edge 41 extending in the lateral direction. A projection 43f and a recess 43r capable of being fitted to each other are formed on front and rear surfaces of the ear 37 to couple the metal elements 32, 32 which are adjacent to each other in the fore-and-aft direction.

As can be seen from FIGS. 3 and 4, when the metal element 32 is formed by stamping, the front main surface 40f in the direction of travel is simultaneously formed with three contact faces $T_C$, $T_L$ and $T_R$ slightly projecting from its periphery. The projecting amount of each of the contact faces $T_C$, $T_L$ and $T_R$ is set at such a value that the contact faces $T_C$, $T_L$ and $T_R$ are compressed when a torque is transmitted and the pair of front and rear main surfaces 40f and 40r are brought into close contact with each other (e.g., about 5 to 10 μm). The central contact fact $T_C$ is formed on a laterally central portion of the metal element 32, a radially inner end of the contact face $T_C$ coincides with the rocking edge 41, and its radially outer end is placed at the same height as saddle surfaces 44, 44 of ring slots 35, 35. The left and right contact faces $T_L$ and $T_R$ are formed symmetrically on left and right opposite ends of the ear 37 of the metal element 32. In the present embodiment, a centroid P of the three contact faces $T_C$, $T_L$ and $T_R$ is set on a central line $L_1$ in the thickness direction of the metal ring assemblies 31, 31.

If it is assumed that the mass of the contact faces $T_C$, $T_L$ and $T_R$ are uniformly distributed, the centroid P of the three contact faces $T_C$, $T_L$ and $T_R$ is a point corresponding to the center of the mass, and the centroid P is also called a barycenter. When the lateral direction is represented by an X-axis and the radial direction is represented by an Y-axis, X coordinate Xp of the centroid P is obtained by the following equation:

$$Xp = \int x \, dA/A$$

Y coordinate Yp is obtained by the following equation:

$$Yp = \int y \, dA/A$$

wherein x and y are the X coordinate and Y coordinate respectively having the very small area dA on the contact faces $T_C$, $T_L$ and $T_R$, and A is the total area of the contact faces $T_C$, $T_L$ and $T_R$.

In the present embodiment, since the three contact faces $T_C$, $T_L$ and $T_R$ are disposed bilaterally symmetrically with respect to a center line C of the metal element 32, the centroid P always lies on the center line C. If the sizes and radial positions of the three contact faces $T_C$, $T_L$ and $T_R$ are varied, the position of the centroid P is varied in the radial direction (direction of Y coordinate) on the center line C.

FIG. 4 shows the metal elements with no pushing force F applied between adjacent metal elements 32, the three contact faces $T_C$, $T_L$ and $T_R$ of one of adjacent metal elements 32 abut against the other metal element 32.

Figure 5:
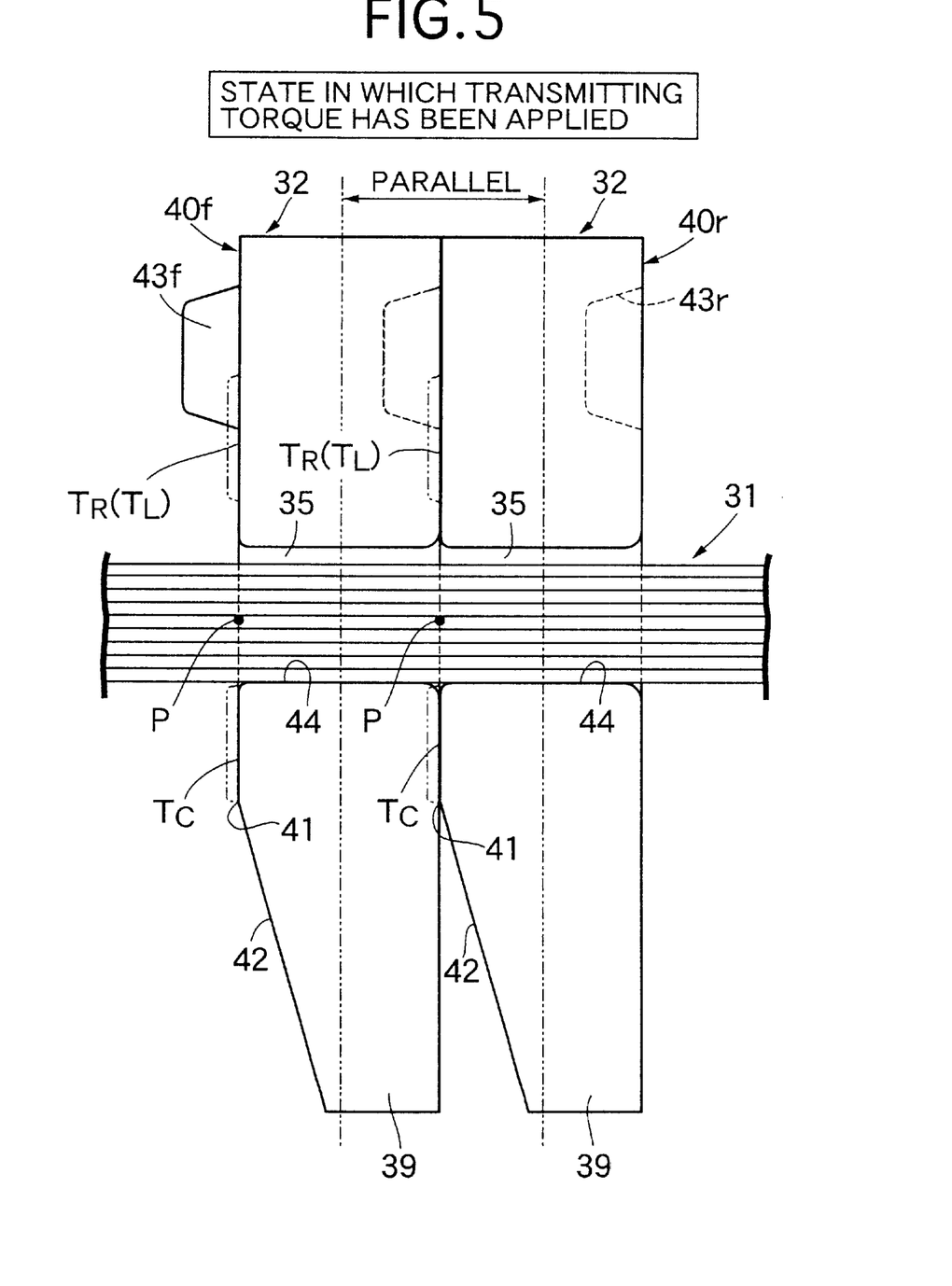
FIG. 5 is a view similar to FIG. 4 for explaining operation with a transmitting torque applied.

As shown in FIG. 5, since it is assumed that the pushing force F between the metal elements 32 acts along the central line $L_1$ (see FIG. 3) in the thickness direction of the metal ring assemblies 31, 31, the pushing force F passes through the centroid P of the three contact faces $T_C$, $T_L$ and $T_R$. If the pushing force F acts on the centroid P, a compression load caused by the pushing force F is uniform over the entire region of the three contact faces $T_C$, $T_L$ and $T_R$, a compressive strain of the three contact faces $T_C$, $T_L$ and $T_R$ is also uniform according to the above-described definition of the centroid P, whereby the pair of front and rear main surfaces 40f, 40r of adjacent metal elements 32, 32 are brought into close contact with each other. As a result, since adjacent metal elements 32, 32 are kept in parallel to each other in the compressed-side chord of the metal belt 15 on which the pushing force F acts, the compressed-side chord becomes straight as shown n FIG. 8A, and it is possible not only to transmit the driving force from the drive pulley 6 to the driven pulley 11 most effectively, but also to reduce loads which the inner circumferential surfaces of the metal ring assemblies 31, 31 receive from the ring slots 35, 35 of the metal element 32, and to elongate the life of the metal ring assemblies 31, 31.

Figure 6:
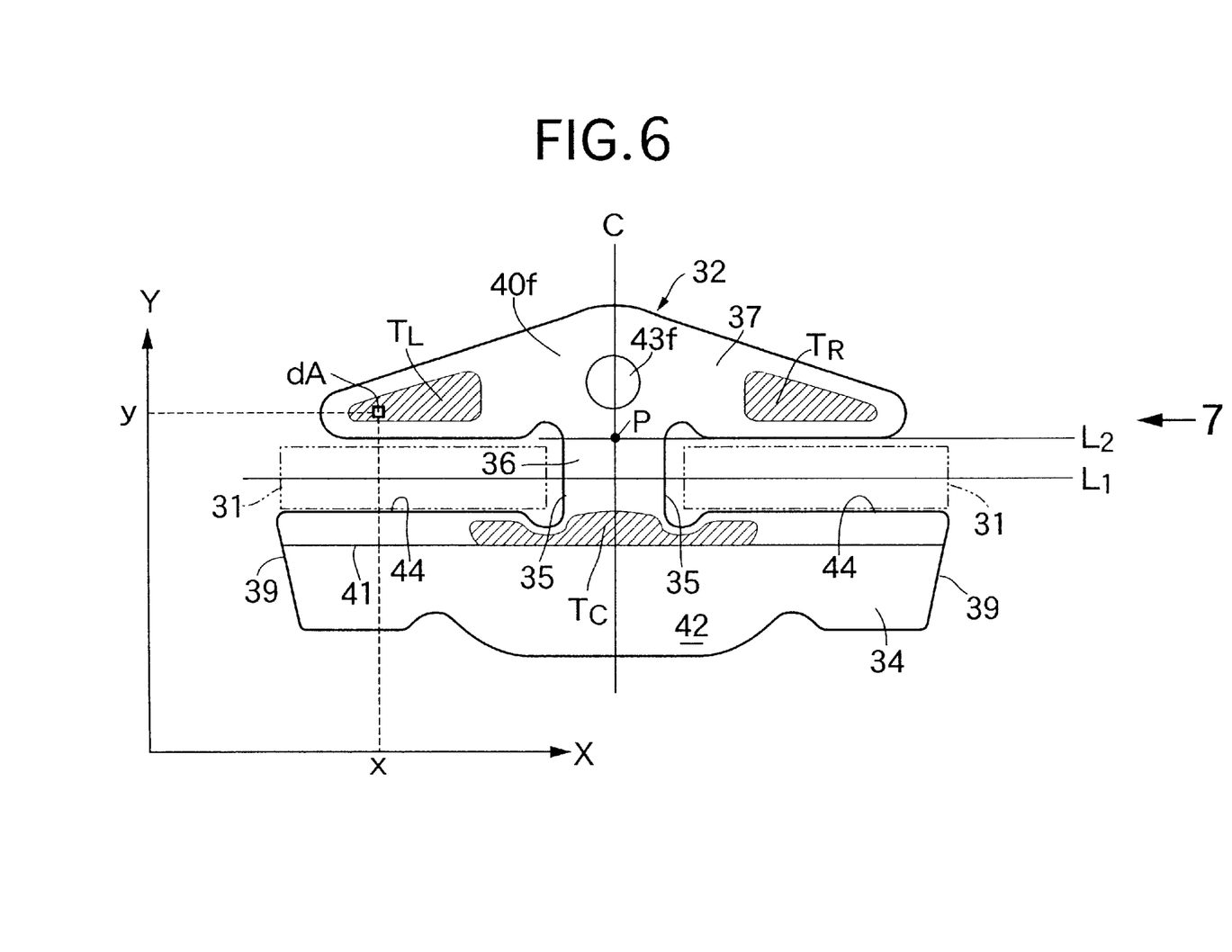
FIG. 6 is a front view of a metal element of the second embodiment.
Figure 7:
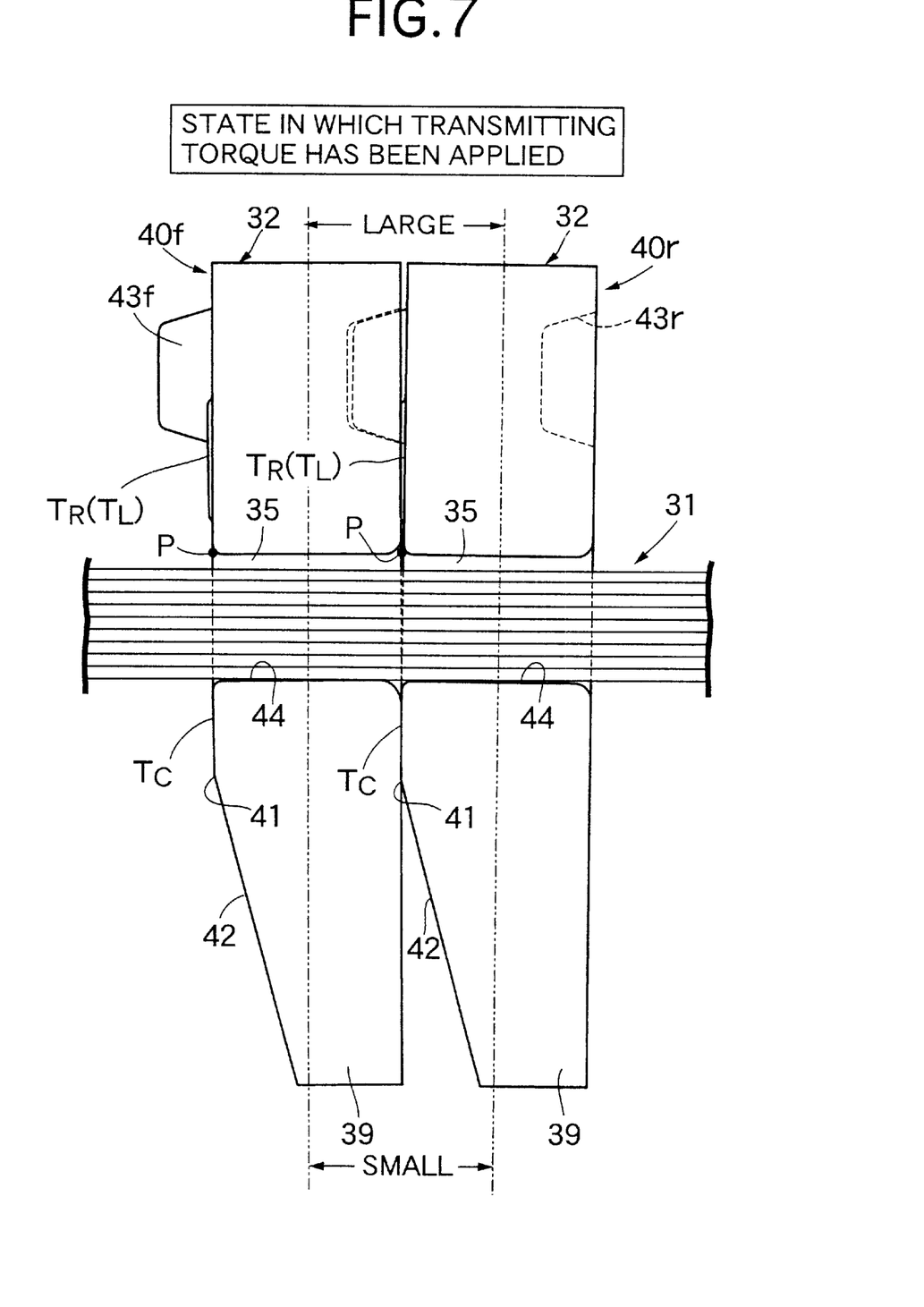
FIG. 7 is a view corresponding to FIG. 5 for explaining operation showing a state in which the transmitting torque is applied.

FIGS. 6 and 7 show a metal element 32 of a second embodiment. An ear 37 of the metal element 32 is elongated in the lateral direction, and two contact faces $T_L$ and $T_R$ are increased in size. As a result, the centroid P of the metal element 32 of the second embodiment moves radially outward as compared with that of the first embodiment and is located on a line $L_2$ along radially outer edges of the ring slots 35, 35. In the second embodiment, in the compressed-side chord of the metal belt 15, since the pushing force F acts radially inwardly from the centroid P of the metal element 32, a compression load acting on the one contact face $T_C$ located radially inward becomes greater than compression loads acting on the two contact faces $T_L$ and $T_R$ located radially outward, the one contact face $T_C$ located radially inward is largely compressed and deformed so that the front and rear main surfaces 40f and 40r of the adjacent metal elements 32, 32 are brought into close contact with each other. On the other hand, the two contact faces $T_L$ and $T_R$ located radially outward are not completely compressed and deformed and therefore, the front and rear main surfaces 40f and 40r of adjacent metal elements 32, 32 are not brought into close contact with each other.

The state of the metal element 32 when the pushing force F does not act thereon is the same as that of the first embodiment shown in FIG. 4 (thicknesses of the three contact faces $T_C$, $T_L$ and $T_R$ are shown in an emphasized manner).

With the above structure, the compressed-side chord is slightly warped outwardly (projected radially outwardly) as shown in FIG. 8B, and the inner circumferential surfaces of the metal ring assemblies 31, 31 come into contact with the saddle surfaces 44, 44 of the ring slots 35, 35 under appropriate surface pressure. Therefore, it is possible to stabilize the attitude of the metal element 32 in the rolling direction, and to prevent noise and vibration from being generated without lowering the durability of the metal ring assemblies 31, 31.

If the centroid P of the three contact faces $T_C$, $T_L$ and $T_R$ is located radially inward from the central line $L_1$ in the thickness direction of the metal ring assemblies 31, 31, the compressed-side chord is adversely warped inwardly (projected radially inwardly) as shown in FIG. 8C by the pushing force acting along the central line $L_1$ in the thickness direction of the metal ring assemblies 31, 31. As a result, the inner circumferential surfaces of the metal ring assemblies 31, 31 float from the saddle surfaces 44, 44 of the metal element 32 and come into contact with radially outward edges of the ring slots 35, 36. Therefore, the life of the metal ring assemblies 31, 31 is substantially shortened and the metal element 32 rolls and its attitude becomes unstable and therefore, vibration or noise is generated.

If the centroid P of the three contact faces $T_C$, $T_L$ and $T_R$ is located radially outward from the line $L_2$ along the radially outer edges of the ring slots 35, 35, the compressed-side chord is adversely warped more outward than the state shown in FIG. 8B. As a result, the transmitting efficiency of the driving force is substantially lowered, the inner circumferential surfaces of the metal ring assemblies 31, 31 receive great loads from the saddle surfaces 44, 44 of the ring slots 35, 35, of the metal elements 32 and the durability thereof is shortened.

Therefore, if the centroid P of the three contact faces $T_C$, $T_L$ and $T_R$ is located between the position shown in FIG. 3 and the position shown in FIG. 6, i.e., between the central line $L_1$ in the thickness direction of the metal ring assemblies 31, 31 and the line $L_2$ along the radially outer edges of the ring slots 35, 35, the compressed-side chord of the metal belt 15 can assume a straight shape or a slightly outwardly warped shape, and it is possible to extend the life of the metal ring assemblies 31, 31, to reduce noise and vibration, and to enhance the power transmitting efficiency.

Although the contact faces $T_C$, $T_L$ and $T_R$ are formed on the front main surface 40$f$ of the metal element 32 in the direction of travel in the embodiments is disclosed, these contact faces $T_C$, $T_L$ and $T_R$ may be formed on the rear main surface 40$r$ of the metal element 32 in the direction of travel, or may be formed on both the front and rear main surfaces 40$f$ and 40$r$. Further, the number of the contact faces $T_C$, $T_L$ and $T_R$ is not limited to three in the embodiments, and the number and the shape thereof may arbitrarily be changed.

Peripheral edges of the contact faces $T_C$, $T_L$ and $T_R$ may not have angles and may smoothly rise as shown with chain lines in FIG. 4.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A belt for a continuously variable transmission comprising, a plurality of metal ring assemblies each metal ring assembly having a plurality of laminated endless metal rings, and a plurality of metal elements each having ring slots to which said metal ring assemblies are fitted, said belt being wound around a drive pulley and a driven pulley for transmitting a driving force from said drive pulley to said driven pulley, wherein a main surface of each of said metal elements includes contact faces formed thereon for transmitting a compression load in the fore-and-aft direction, and wherein a radial position of the centroid of said contact faces is set between a center in the thickness direction of said metal ring assembly fitted into said ring slot and the radial outer edge of said ring slot.

2. A belt for continuously variable transmission as set forth in claim 1, wherein the centroid of said contact faces is at the center of said contact faces in the radial direction.

3. A belt for continuously variable transmission as set forth in claim 1, wherein the centroid of said contact faces is at the radial outer edge of the ring slot in said metal element.

4. A belt for a continuously variable transmission comprising, a plurality of metal ring assemblies each metal ring assembly having a plurality of laminated endless metal rings, and a plurality of metal elements each having ring slots to which said metal ring assemblies are fitted, said belt being wound around a drive pulley and a driven pulley for transmitting a driving force from said drive pulley to said driven pulley, wherein each of said metal elements is provided at a front side and a rear side thereof with main surfaces which extend parallel to each other, one of said main surfaces being connected to an inclined surface through a rocking edge, and at least one of said main surfaces includes contact faces formed thereon for transmitting a compression load in the fore-and-aft direction, and wherein the radial position of the centroid of said contact faces is set between the center, in the thickness direction, of said metal ring assembly fitted into said ring slot and the radial outer edge of said ring slot.

* * * * *